US007669226B2

(12) United States Patent
Bhide et al.

(10) Patent No.: US 7,669,226 B2
(45) Date of Patent: Feb. 23, 2010

(54) GENERIC DECLARATIVE AUTHORIZATION SCHEME FOR JAVA

(75) Inventors: Manish A. Bhide, New Delhi (IN); Rajeev Gupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 10/909,107

(22) Filed: Jul. 30, 2004

(65) Prior Publication Data

US 2006/0026667 A1 Feb. 2, 2006

(51) Int. Cl.
*H04L 9/00* (2006.01)
*H04L 9/32* (2006.01)
*G06F 15/16* (2006.01)
*G06F 9/00* (2006.01)

(52) U.S. Cl. ............... 726/1; 726/12; 726/26; 713/166; 713/183; 713/193; 709/203; 709/217; 709/225

(58) Field of Classification Search ................ 713/170; 726/1
See application file for complete search history.

(56) References Cited

U.S. PATENT DOCUMENTS

| | | | |
|---|---|---|---|
| 6,202,066 B1 * | 3/2001 | Barkley et al. ............... 707/9 |
| 6,647,388 B2 * | 11/2003 | Numao et al. ............... 707/9 |
| 7,089,584 B1 * | 8/2006 | Sharma ............... 726/4 |
| 7,240,365 B2 * | 7/2007 | de Jong et al. ............... 726/9 |
| 7,404,203 B2 * | 7/2008 | Ng ............... 726/6 |
| 2001/0023421 A1 * | 9/2001 | Numao et al. ............... 707/9 |
| 2002/0013862 A1 | 1/2002 | Orchard et al. |
| 2002/0188869 A1 * | 12/2002 | Patrick ............... 713/201 |
| 2003/0130953 A1 | 7/2003 | Narasimhan et al. |
| 2004/0078577 A1 * | 4/2004 | Feng et al. ............... 713/182 |
| 2004/0083367 A1 * | 4/2004 | Garg et al. ............... 713/170 |
| 2004/0225893 A1 * | 11/2004 | Ng ............... 713/200 |
| 2004/0225896 A1 * | 11/2004 | Ng ............... 713/201 |
| 2004/0250120 A1 * | 12/2004 | Ng ............... 713/201 |

OTHER PUBLICATIONS

Damiani, Ernesto et al. "A Fine-Grained Access Control System for XML Documents." May 2002. ACM Transactions on Information and Systems Security. vol. 5, No. 2. p. 169-202.*

(Continued)

*Primary Examiner*—Christian LaForgia
(74) *Attorney, Agent, or Firm*—Gibb I.P. Law Firm, LLC

(57) ABSTRACT

A method, system, and program storage device for establishing security and authorization policies for users accessing a software application, wherein the method comprises generating at least one application object group from an application object description document comprising an XML format run on a data processor; creating an authorization policy for each application object; sending a selected application object group to an access controller; and establishing access control parameters at a time of deployment of the software application for users attempting to access the selected application object group based on the authorization policy. The method further comprises specifying environmental variables for the authorization policy; changing the authorization policy by modifying a declarative specification of the environmental variables and modifying constraints defined on attributes of an application object; implementing varied classes of authorization policies using a same authorization policy classifier; and specifying the application object group using grouping parameters.

20 Claims, 6 Drawing Sheets

OTHER PUBLICATIONS

Bertino, Elisa et al. "Controlled access and dissemination of XML documents" Nov. 1999. Proceedings of the 2nd international workshop on Web information and data management WIDM '99. p. 22-27.*

Bertino, Elia et al. "On specifying security policies for Web Documents with an XML-based language." May 3-4, 2001. SACMAT '01. p. 57-65.*

Serge Abiteboul, Sophie Cluet, Tova Milo, Victor Vianu, "Active Views for Electronic Commerce", Mar. 16, 1998, pp. 1-25.

Nathan N. Vuong, Geoffrey S. Smith, Yi Deng, Managing Security Policies in a Distributed Environment Using eXtensible Markup Language (XML), 2001, pp. 405-411.

Julien Vayssière, "Security and Meta Programming in Java", pp. 1-5.

Tony Sintes, "Using XML for Dynamic Configuration", Jul. 2000, pp. 1-7, Dr. Dobb's Journal, XML and Software Configuration.

John Boyer, "An XML-based Forms Language for E-Commerce", Dec. 1999, pp. 1-7, Dr. Dobb's Journal, XFDL: The Extensible Forms Description Language.

Manfred Hauswirth, Clemens Kerer, Roman Kurmanowytsch, "A Secure Execution Framework for Java", 2000, pp. 43-52.

Hashii, et al., "Supporting Reconfigurable Security policies for Mobile Programs," Computer Networks 33, 2000, pp. 77-93.

Burt, et al., "Model Driven Security: Unification of Authorization Models for Fine-Grain Access Control," Proceedings of the Seventh IEEE International, Enterprise Distributed Object Computing Conference, Sep. 16-19, 2003, pp. 1-13.

* cited by examiner

Figure 1

```
Policy file for Java® grant codebase "file:${java.home}/lib/ext/*" {
        permission java.security.AllPermission;
};

grant {
        permission java.util.PropertyPermission "os.name", "read";
        permission java.util.PropertyPermission "os.version", "read";
        permission java.util.PropertyPermission "os.arch", "read";
};
```

Figure 2

```
Code for protecting a Java® method using AccessController

DummyMethod( ) {
        Permission perm=new java.io.FilePermission ("foo.txt", "write");
        AccessController.checkPermission (perm);
        //do file writing
}
```

Figure 3

```
Policy for Principal based authorization in JAAS grant codebase "file:./MyAction.jar",
        Principal sample.principal.ExamplePrincipal "Bunny" {
                Permission java.io.FilePermission "max.txt", "read";
};
```

Figure 4

Pseudocode for Protecting method using GenericPermission

```
DummyMethod( ) {
    Permission perm=new GenericPermission (String class, String action, Object object);
    AccessController.checkPermission (perm);
    //perform action
}
```

Figure 5

Authorization policy in generic authorization

```
<policy>
    <grant codebase="file:/D/ exampleActions.jar">
        <principal
classname="com.ibm.resource.security.auth.PrincipalExample"
            name="users">
            <permission name="com.ibm.example.UserProfile"
                actions="create" />
            <permission name="com.ibm.example.UserProfile"
                actions="write,delete"
                idname="getCreator" idtype="method" idvalue="jane"
/>
            <permission name="com.ibm.example.UserProfile"
                actions="write"
                idname="getCreator" idtype="method" idvalue="lou" />
        </principal>
    </grant>
</policy>
```

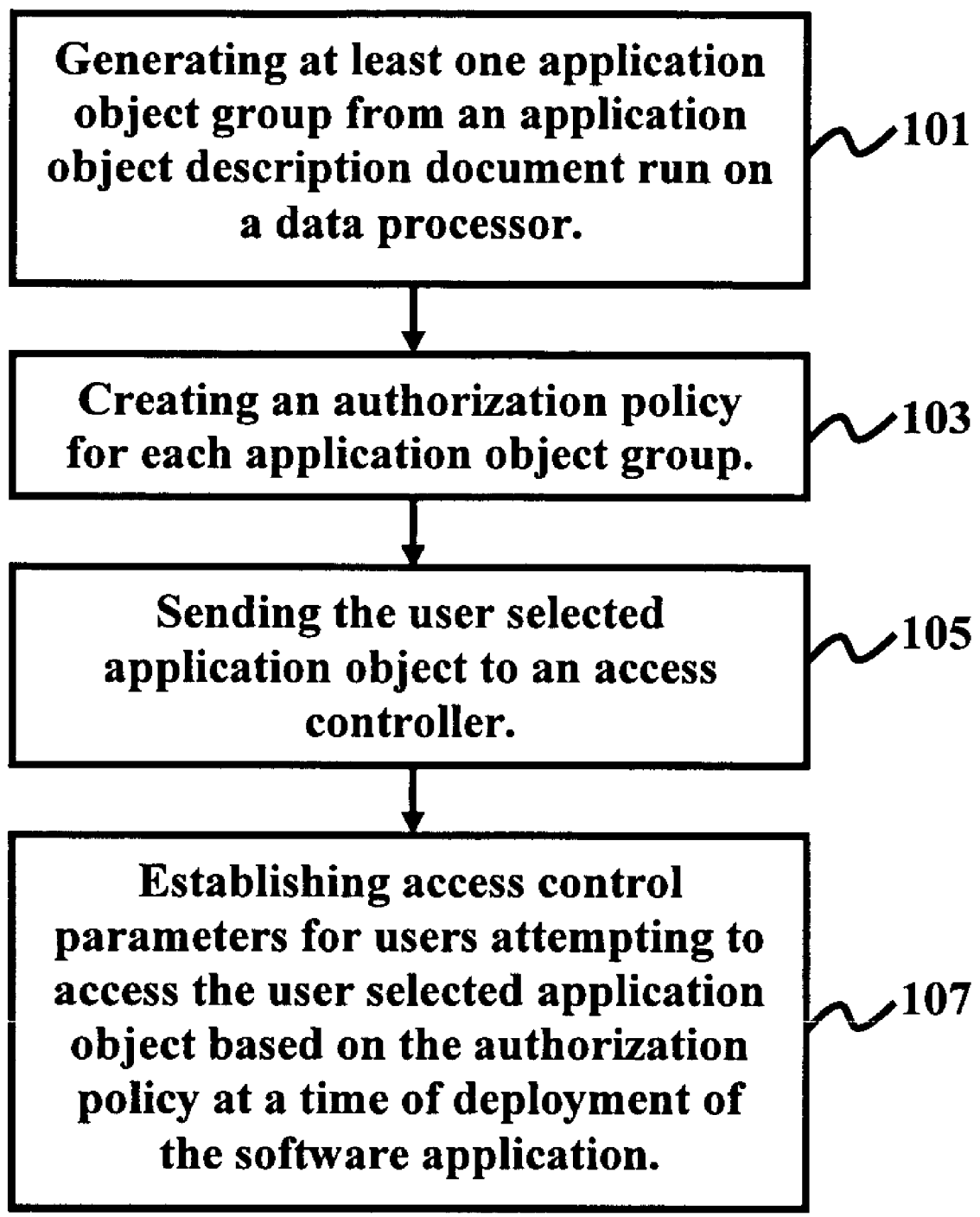

GENERIC DECLARATIVE AUTHORIZATION SCHEME FOR JAVA

BACKGROUND OF THE INVENTION

1. Field of the Invention

The embodiments of the invention generally relate to software application development, and more particularly to Java®-based security and authorization software application development systems and methods.

2. Description of the Related Art

Security and authorization play very important roles in the development, deployment, and functioning of software systems. Java®, available from Sun Microsystems, Inc., Santa Clara, Calif., USA, is the most popular platform for component-based software and systems. Moreover, Java® security plays a key role in e-commerce enterprise systems. Security features are typically built into an application in an ad-hoc manner or integrated with an enterprise J2EE® (Java® 2 Platform Enterprise Edition), available from Sun Microsystems, Inc., Santa Clara, Calif., USA, application using container managed authentication and authorization. There are several reasons for such a situation. First, security must be handled by nearly all of the components of the application; however its integration in the software development is not centralized. Second, there is a lack of a standard easy-to-use process for developing granular security. In J2EE® systems, containers provide method-level security and role-based access control which may not be sufficient for many situations. Overall, the low-level of security development makes security implementation rigid and tightly coupled with the application.

Java® Authentication and Authorization Service (JAAS) is a Java® package that enables services to authenticate and enforce access controls on users. In other words, JAAS is a set of Java® Application Program Interfaces (APIs) that can be used for two purposes: (1) for authentication of users, to reliably and securely determine who is currently executing Java® code, regardless of whether the code is running as an application, an applet, a bean, or a servlet; and (2) for authorization of users to determine if the authenticated user is allowed to access the resource (which can be the Java® code or some object/entity accessed by the Java® code), regardless of whether the code is running as an application, an applet, a bean, or a servlet. Typically, JAAS authentication is performed in a pluggable fashion. This permits Java® applications to remain independent from the underlying authentication technologies. Moreover, new or updated technologies can be plugged in without requiring modifications to the application itself.

Java® uses three types of defense mechanisms: byte-code verifier, class loader, and security manager. In Java® Version 1.0, applets operate in a "sandbox," which restricts the applet's ability to either affect the machine they are executed on or to obtain any sensitive information from it. As such, nothing much can be accessed locally. In later versions of Java®, applets are allowed to escape the sandbox if the machine running it allows it to do so based on signing information. To support flexible, fine gained access control, Java® version 1.2 provides for policy based security architecture. The policy is defined by a set of permissions for code in various locations and by various signers. Permission allows access to certain actions on a certain resource. Usually, resource names and their associated actions are enumerated in a policy file. FIG. 1 illustrates a typical policy file in Java®.

In Java® version 2, two functions, earlier provided by the SecurityManager, namely establishment of security policy and enforcement of security policy, are separated. The java.security.Policy abstract class is used for establishing the security policy and the AccessController is used as the security enforcer. For backward compatibility, the SecurityManager class still exists but it refers to the AccessController for its decisions. In java.policy, permissions are associated with the code-source. As such, it does not have user or role based permissions. FIG. 2 illustrates a typical code for protecting a Java® method using AccessController. The example illustrated in FIG. 2 shows how a resource is protected by calling the AccessController before accessing the resource. The AccessController checks the requested permission with the application's current authorization policy. If any permission defined in the policy file implies the requested permission, the method "checkpermission" command simply returns; otherwise an AccessControlException is initiated.

As mentioned above, JAAS is a set of APIs that enable services to authenticate and enforce access controls upon users. JAAS reliably and securely determines who is currently executing the Java® code and whether it is allowed to do so. Moreover, JAAS implements a Java® technology version of the standard Pluggable Authentication Module (PAM) framework. This permits Java® applications to remain independent from the underlying authentication mechanism.

JAAS includes two primary components: authentication and authorization. JAAS adds subject based policies to the Java® version 2 security model. Permission is granted not only based on the CodeSource but also based on the user executing the code. For this the user is first authenticated. JAAS distribution contains various LoginModules implementations to retrieve the user id and password from the user. The LoginContext uses a login configuration file to determine which LoginModule to use for authentication. The Subject class is used to encapsulate the credentials of the authenticated user. A subject can have multiple identities called principals. In the JAAS policy file each grant statement is associated with a principal. For each principal associated with the subject, the AccessController obtains permissions from the PolicyFile and checks whether any permission implies the requested permission. Otherwise, the AccessController initiates an AccessControlException. FIG. 3 illustrates the typical policy for principal based authorization in JAAS.

In J2EE® architecture, a container serves as an authorization boundary between the components it hosts and their callers. The container establishes the identity of the user of the calling code. Access to the called component, an EJB (Enterprise JavaBeans™, available from Sun Microsystems, Inc., Santa Clara, Calif., USA), or a web component, is determined by comparing the caller's security attributes with those required to access the called component. In declarative authorization, a deployer establishes the container-enforced access control rules for a J2EE® application. The deployer maps an application permission model, typically supplied by the application assembler, to mechanisms specific to the runtime environment. The deployment descriptor defines security roles and their associated access rights for various components. The deployer assigns security roles to specific callers to establish the access rights of users in the runtime environment. For example, a deployer can map a security role to a list of principal identities in the operational environment. Then, callers, authenticated with one of these identities, are assigned the privilege represented by the role. A J2EE® container makes access control decisions before the dispatching method calls to a component. Thus, declarative access control can be assigned with the method's granularity.

The J2EE® container does not factor in the logic or state of the component in these access decisions. To do that, programmatic authorization is required to be performed by the code developer. A component can use two methods to perform fine-grained access control: EJBContext.isCallerInRole (for EJB components) and HttpServletRequest.isUserInRole (for web components). A component uses these methods to determine whether a caller has been granted a privilege selected by the component based on the parameters of the call, the internal state of the component, or other factors such has runtime parameters. However, there is a trade-off between the declarative and programmatic authorization. The declarative authorization is an external access control policy configured by the deployer whereas the programmatic authorization is through an internal policy embedded in the application by the component developer. The internal policy is more fine-grained whereas the external policy is more flexible. Moreover, the external policy is transparent whereas the internal policy is buried in the application. For example, to provide the authorization policy, "Employees can only access their own salary information," programmatic authorization is required, which cannot be changed in the future, if required.

Moreover, JAAS is built on top of the pre-existing security model of Java®, which is CodeSource based and the plaintext format policy file implementation. JAAS implements authorization based on the class accessed by a certain component. However, this may not be sufficient for an enterprise application, whereby one may wish to use the custom security repositories, like LDAP (Lightweight Directory Access Protocol) with JAAS. Further, in business-to-business electronic commerce a pricing contract may have different access control policies than another contract. The specification for a self-service auction application might have the requirement that "any registered user can create an auction but only the user who created the auction is allowed to modify it." Thus, many Java® applications are required to extend JAAS to satisfy its authorization requirements. Because of pluggable features of JAAS, one can write his/her own implementation of various authentication and authorization sub-modules to change the default behavior of JAAS. For the authorization requirements illustrated in the above examples, one may need to change the default implementations of one or more of the following:

- java.security.Permission: The AccessController.checkPermission (Permission perm) is called to determine whether the caller has the authority to perform the action on the called CodeSource. The permission object perm represents the required access to a resource. The permission object can specify things such as name of the permission (which may indicate the resource on which access is required), action for which the resource is accessed, etc. The permission class implements an implied method to be called by the AccessController to determine whether a granted permission implies the requested permission. For implementing class instance level authorization, one needs to have a new implementation of permissions having an object instance as one of its field. That object can be used in the implied method to decide authorizations.
- java.security.PermissionCollection: This abstract class is used for representing a collection of permission objects. This class can be implemented to have a desired manner of storing the granted permissions and comparing them with the requested permission to determine if any of the granted permissions implies a requested permission.
- java.security.Policy: This is an abstract class for storing security policies in a Java® application environment. The AccessController contacts the policy implementation to obtain the permissions for an authenticated subject on a CodeSource. The policy object consults its policy specification and returns an appropriate PermissionCollection object enumerating the permissions that are allowed. By default, sun.security.provider.PolicyFile implementation is used for policy implementation. By having different implementation one can change the way policies are written (for example, LDAP or software applications) or additional parameters on which the authorization depends.
- javax.security.auth.spi.LoginModule: The LoginModule describes the interface implemented by the authentication provider. It retrieves the username and password(s) from the callbacks, which, by default, performs some user interaction. The LoginModule can be extended to delegate the authentication to some external adaptor.
- java.security.Principal: The Principal interface represents the abstract notion to be used to represent an entity such as an individual, an organization, a group, or a login id. Group, KerberosPrincipal, etc. are well known implementations of Principal. By extending the Principal one can add custom properties to be used for authorization.

However, one of the limitations of JAAS is that it does not support class instance level authorization; i.e., the authorization in JAAS is performed on the basis of the class name and not on the basis of a specific instance of the class. For example, the specification for a web-based, self-service auction application may have the following requirement: "Any registered (authenticated) user can create an auction but only the user who created the auction may modify it." This means that any user can execute the code written to create an auction class instance, but only the user who owns that instance may execute code designed to modify it. Usually, the user who created the auction instance will be the owner. What this implies is that people of the same role might have different access rights based on their attributes or the actions that they have performed in the past. Unfortunately, this type of authorization cannot be supported using JAAS.

JAAS authorization extends the existing Java® security architecture that uses a security policy to specify what access rights are granted to the executing code. This security architecture, as provided in the Java® version 2 platform, is code-centric. That is, the permissions are granted based on code characteristics; i.e., where the code is coming from and whether it is digitally signed and if so, by whom. With the integration of JAAS into the Java® 2 SDK (Software Development Kit), the java.security.Policy API handles principal-based queries, and the default policy implementation supports principal-based grant entries. Thus, access control can now be based on which code is running, as well as who is running the code.

JAAS does provide a mechanism to support instance level JAAS. This is accomplished by extending some of the classes that are used by JAAS. However, the main drawback of this approach is that it is not extensible and it requires the creation of a new authorization class and a significant amount of rework if different kinds of authorizations in different domains are to be provided. Another option for supporting instance level authorization is to use a custom authorization code which is coded as part of the application. Generally, this is the most widely used method to support the authorization technique and the major drawback of this is that it is not based on standards making it more difficult to apply in different applications. Furthermore, since the code is part of the application, it is difficult to maintain and because it is non-generic it generally cannot be reused in different domains.

Therefore, due to the drawbacks and limitations of the conventional approaches, there remains a need for a more universally applicable JAAS-based authorization solution, which can be applied to different domains without requiring any new code. Writing new code for a new authorization requirement makes it difficult to change authorization settings at deployment time. Thus, what is needed is the flexibility of a declarative authorization with the high granularity of programmatic authorization.

SUMMARY OF THE INVENTION

In view of the foregoing, an embodiment of the invention provides a method of establishing security and authorization policies for users accessing a resource, data, or code represented by any of software objects and applications, wherein the method comprises generating at least one application object group from an application object description document run on a data processor; creating an authorization policy for each application object group; sending a selected application object to an access controller; and establishing access control parameters at a time of deployment of a software application for users attempting to access the selected application object based on the authorization policy. In the step of generating, the application object description document comprises an extensible Markup Language (XML) format. The method further comprises specifying environmental variables for the authorization policy and changing the authorization policy by modifying a declarative specification of the environmental variables and modifying constraints defined on attributes of an application object. Additionally, the method further comprises specifying the application object group using: any of a method and field parameter associated with the application object (and defining constraints on these method and field parameters); a predetermined relationship among all application object groups; or predetermined grouping actions to parse the application object description document into the at least one application object group. Moreover, the method further comprises implementing varied classes of authorization policies using a same authorization policy classifier.

Another embodiment of the invention provides a method of controlling access to a software application, wherein the method comprises grouping application objects in the software application according to a grouping parameter; establishing a user profile for each class of user accessing the application objects; specifying an authorization policy comprising access control parameters for each of the grouped application objects; and matching the authorization policy with the user profile for a user attempting to access selected grouped application objects at a time of deployment of the software application, wherein in the step of grouping, the software application comprises an application object description document comprising the application objects, wherein the application object description document comprises an XML format. The method further comprises specifying environmental variables for the authorization policy and changing the authorization policy by modifying a declarative specification of the environmental variables and the grouping constraints. In the step of grouping, the grouping parameter comprises specifying the application objects using: any of a method and field parameter associated with the application objects; a predetermined relationship among all application objects in the software application; or predetermined grouping actions to parse the resource, data or code represented by software application/objects into the at least one application object group. The method further comprises implementing varied classes of authorization policies using a same authorization policy classifier.

Another aspect of the invention provides a system for establishing security and authorization policies for users accessing a software application, wherein the system comprises means for generating at least one application object group from an application object description document run on a data processor; means for specifying an authorization policy for each application object group; means for sending a selected application object group to an access controller; and means for establishing access control parameters at a time of deployment of the software application for users attempting to access the selected application object group based on the authorization policy.

Another embodiment of the invention provides a system for controlling access to a software object, wherein the system comprises an application object description document comprising at least one application object group; an authorization policy classifier adapted to specify an authorization policy for each the application object group; and an access controller adapted to establish access control parameters for users attempting to access a selected application object group based on the authorization policy at a time of deployment of the software object, wherein the application object description document comprises an XML format, and wherein the authorization policy comprises environmental variables. The system further comprises a generator routine adapted to change the authorization policy by modifying a declarative specification of the environmental variables and grouping rules. According to the system, the application object group is specified using: any of a method and field parameter associated with the user selected application object; a predetermined relationship among all application object groups; or predetermined grouping actions to parse the application object description document into the at least one application object group. Moreover, the authorization policy classifier is adapted to implement varied classes of authorization policies.

Additionally, another aspect of the invention provides a program storage device readable by computer, tangibly embodying a program of instructions executable by the computer to perform a method of establishing security and authorization policies for users accessing a software application, wherein the method comprises generating at least one application object group from a application object description document run on a data processor; specifying an authorization policy for each application object group; sending a selected application object group to an access controller; and establishing access control parameters at a time of deployment of the software application for users attempting to access the selected application object group based on the authorization policy.

The authorization technique provided by the embodiments of the invention provides a method to fulfill authorization requirements without writing any new code, wherein a new authorization scenario can be obtained at deployment time by changing the declarative settings. Additionally, the embodiments of the invention provide a technique to: represent varied authorization requirements in an XML format; parse and generate object groups for authorization purposes using object constraints logic; add environmental variables as authorization parameters; define relationships between authenticated principals; implement a varied class of authorization policies using the same authorization policy provider; and group actions at deployment time.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation.

Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 1 is a typical policy file for Java®;

FIG. 2 is a typical code for a protecting a Java® method using AccessController;

FIG. 3 is a typical policy for a principal based authorization in JAAS;

FIG. 4 is a pseudocode for a protecting method using GenericPermission according to an embodiment of the invention;

FIG. 5 is an authorization policy in a generic authorization according to an embodiment of the invention;

FIG. 6 is a flow diagram illustrating a preferred method of an embodiment of the invention;

DETAILED DESCRIPTION OF PREFERRED EMBODIMENTS OF THE INVENTION

Figure 7A:
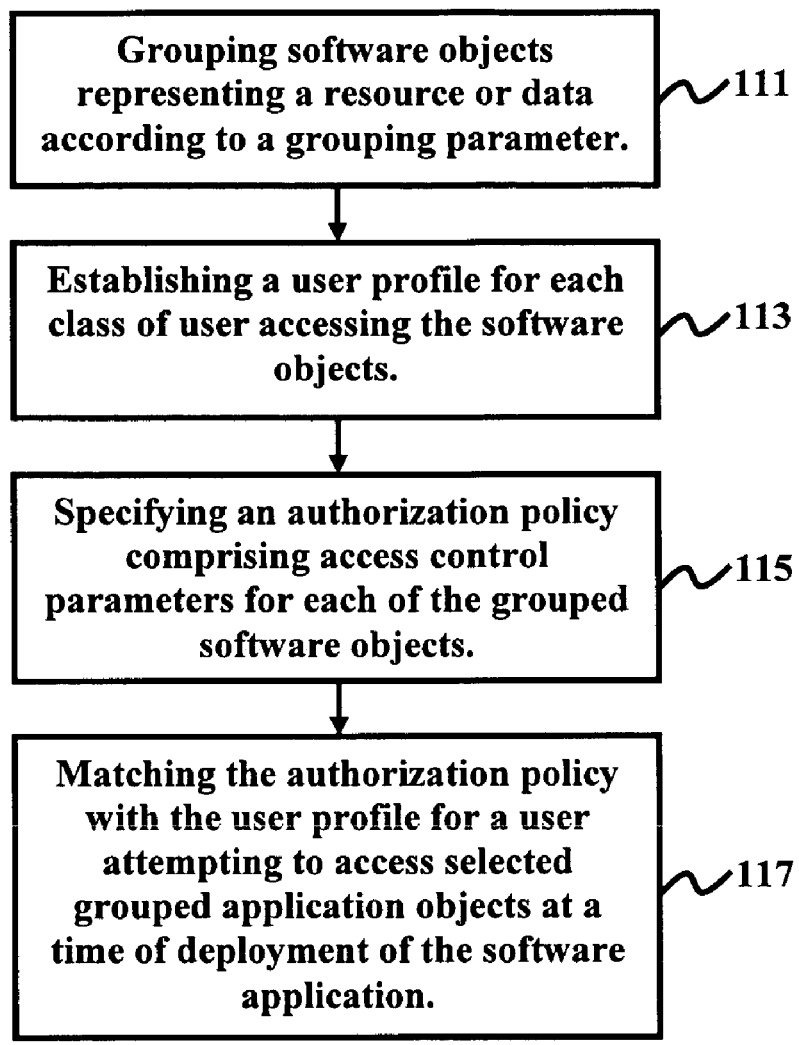
FIG. 7(a) is a flow diagram illustrating a preferred method of an another embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a more universally applicable Java®-based software application development technique, which can be applied to different domains without requiring significant changes to the authorization setup. The embodiments of the invention address this need by providing generic, low-level, extensible security to Java® applications based on JAAS standards. Referring now to the drawings, and more particularly to FIGS. 4 through 9, there are shown preferred embodiments of the invention.

As described above, JAAS can be extended in a variety of ways to attain various authentication and authorization objectives. However, for various extensions one may need to write code to implement or extend various JAAS interfaces and classes respectively. As such, this makes it difficult to change the security settings at the time of deployment of the application. Thus, the generic authorization technique provided by the embodiments of the invention attains this flexibility by using the declarative authorization while keeping the high granularity of the programmatic authorization.

Accordingly, the authorization technique provided by the embodiments of the invention provides capabilities of programmatic authorization using declarative specifications. Specifically, the embodiments of the invention extend JAAS so that authorization requirements can be fulfilled in a declarative manner rather than in a programmatic manner. Each method which is required to be protected using authentication and authorization begins with a call to the constructor of the GenericPermission object having at least three parameters: the class to which the method belongs; the action the method wants to perform; and the object on which the method is called. FIG. 4 illustrates the pseudocode for a protecting method using GenericPermission according to an aspect of the invention as described above.

As illustrated in FIG. 5, the authorization policy can be expressed in an XML format. For example, an authorization policy for "any registered user can create an auction but only the user who created the auction is allowed to modify it" is written as shown in FIG. 5. Similarly, having different authorization policies for different pricing contracts, permissions are based on {idname="getContractID", idtype="method", idvalue="ibm-sun"} parameters.

For generic authorization, a JDK is configured for a proper authorization policy provider. This is accomplished by changing/adding auth.policy.provider in the Java.security file of the Java_home/jre/lib/security directory, where Java_home is the path where Java® is installed in the system. Because the generic authorization covers a wide variety of authorization policies, even with the limitation that there can be only one authorization policy provider for a number of applications, each having its own authorization requirement, it can be run on the same machine without having to write separate code for each application.

FIG. 6 illustrates a method of establishing security and authorization policies for users accessing a resource, data or code represented by software objects/application, wherein the method comprises generating (101) at least one application object group from an application object description document run on a data processor; creating (103) an authorization policy for each application object; sending (105) the user selected application object to the access controller 208 of the system 200 (shown in FIG. 8); and establishing (107) access control parameters at a time of deployment of a software application for users attempting to access the selected application object group based on the authorization policy. In the step of generating (101), the application object description document comprises an XML format. The method further comprises specifying environmental variables for the authorization policy and changing the authorization policy by modifying a declarative specification of the environmental variables. Additionally, the method further comprises specifying the application object group using: any of a method and field parameter associated with the selected application object; a predetermined relationship among all application object groups; or predetermined grouping actions to parse the application object description document into the at least one application object group. Moreover, the method further comprises implementing varied classes of authorization policies using a same authorization policy classifier.

Another embodiment of the invention is illustrated in FIG. 7(a), which illustrates a method of controlling access to a resource, data or code represented by software objects/application, wherein the method comprises grouping (111) application objects in the software application according to a grouping parameter comprising one or more of object method call results, object field values, and environmental variables; establishing (113) a user profile for each class of user accessing the application objects; specifying (115) an authorization policy comprising access control parameters for each of the grouped application objects; and matching (117) the authorization policy with the user profile for a user attempting to access selected grouped application objects at a time of deployment of the software application, wherein in the step of grouping (111), the software application comprises a application object description document comprising the application objects, wherein the application object description document comprises an XML format.

Figure 7B:
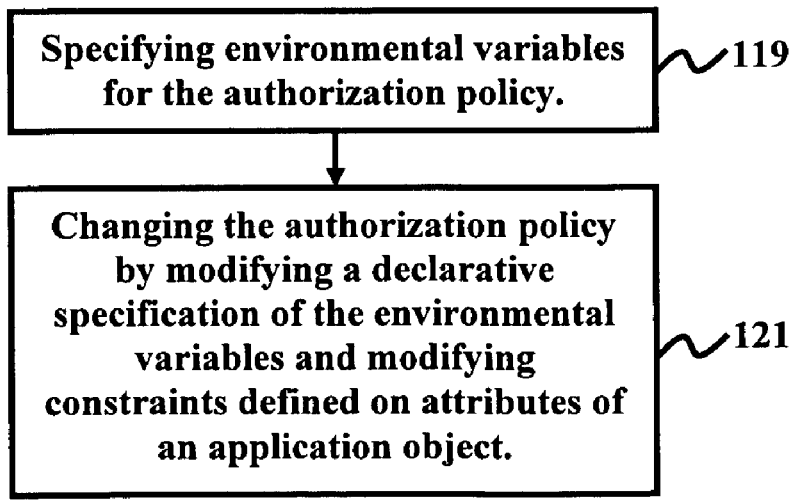
FIG. 7(b) is a flow diagram illustrating a preferred method of another aspect of the invention.

Furthermore, in the step of grouping (111), the grouping parameter comprises specifying the application objects using: any of a method and field parameter associated with the application objects; a predetermined relationship among all application objects in the software application; or predetermined grouping actions to parse the user selected software object into the at least one application object group. As shown in FIG. 7(b), the method further comprises specifying (119) environmental variables for the authorization policy and changing (121) the authorization policy by modifying a declarative specification of the environmental variables. The method further comprises implementing varied classes of authorization policies using a same authorization policy classifier.

According to the method of writing the authorization policies, the embodiments of the invention allow access to some security related and environmental variables such that policies can be dependent on these variables. This makes it possible to have policies such as "allow access to software application on weekdays to A whereas disallow on weekends."

Figure 8:
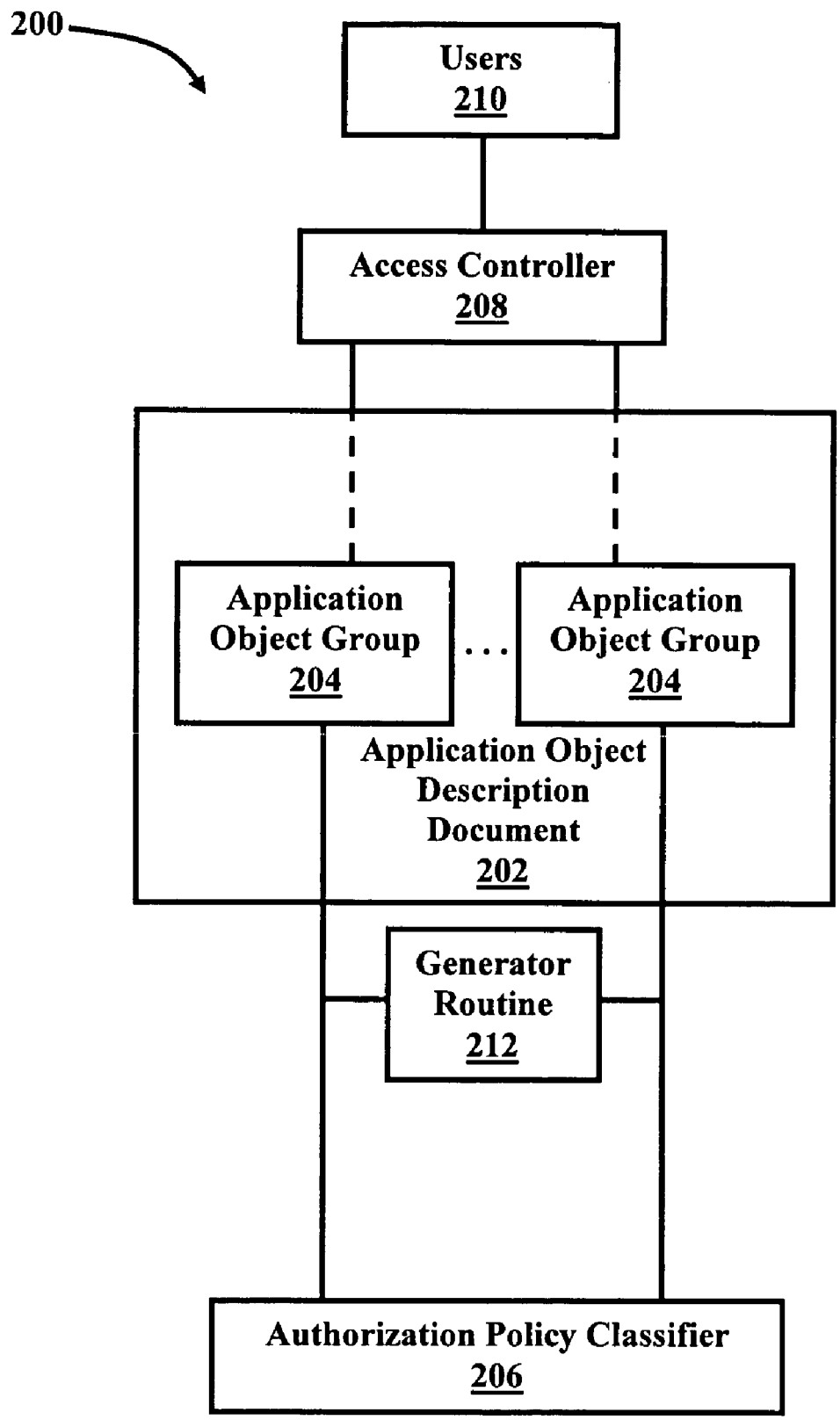
FIG. 8 is a system block diagram according to an embodiment of the invention.

FIG. 8 illustrates a system 200 for controlling access to a software application, wherein the system 200 comprises a application object description document 202 comprising at least one application object group 204; an authorization policy classifier 206 adapted to specify an authorization policy for each application object group 204; and an access controller 208 adapted to establish access control parameters at a time of deployment of a software application for users 210 attempting to access a selected application object group 204 based on the authorization policy at a time of deployment of the software application, wherein the application object description document 202 comprises an XML format, and wherein the authorization policy comprises environmental variables.

The system further comprises a generator routine 212 adapted to change the authorization policy by modifying a declarative specification of the environmental variables. According to the system 200, the application object group 204 is specified using: any of a method and field parameter associated with the application object group 204; a predetermined relationship among all application object groups 204; or predetermined grouping actions to parse the application object description document 202 into the at least one application object group 204. Moreover, the authorization policy classifier 206 is adapted to implement varied classes of authorization policies.

The embodiments of the invention provide a technique to parse the object constraint logic (written in an XML file) and generate object groups for authorization purposes. Conventionally, in JAAS, authorization polices are written at class (code) level. Conversely, according to the embodiments of the invention, the authorization policies are written with the granularity of object groups. Object groups are represented using the method/field of the object concerned. For example, suppose, there is a class called "contract", in JAAS, all contracts will have same authorization properties whereas, in generic authorization provided by the embodiments of ,he invention, a user may be allowed to update a contract with "Sun®" (Sun® is a registered trademark of Sun Microsystems, Inc., Santa Clara, Calif., USA) but may not be allowed to update a contract for "Microsoft®" (Microsoft® is a registered trademark of Microsoft Corporation, Redmond, Wash., USA). In JAAS, authorization on an application object is not dependant on the characteristics of that application object. Hence, all of the application objects have the same authorization rules. To avoid this, custom authorization is typically performed in the conventional approaches. Conversely, the embodiments of the invention provide a technique that allows individuals to use JAAS to perform instance-level authorization (i.e., authorization which is dependant on the characteristics of the data object).

The methods provided by the invention define relationships between authenticated principals. Conventionally, in JAAS, when a user is authenticated, the user is represented by an object of type "Subject". Each subject can have multiple principles associated with it. These principals represent the different identities that the person can have. Hence, a person can be uniquely identified by his Name (which is one principal) or his social security number (which is another principal). However, using the XML based representation provided by the embodiments of the invention, policies such as "If the user (authenticated principal) is the manager of the owner of the object here the object might be about a leave application), then he is allowed to invoke the approval method" may be defined. Again, this is advantageous because the embodiments of the invention provide a technique that allows individuals to use JAAS to perform instance-level authorization (i.e., authorization which is dependant on the characteristics of the data object). Further this is performed in a declarative manner, which is more flexible than programmatic authorization. Moreover, using this setup, dynamic relationships between subjects can be used for authorization purposes. In this example, the policy is defined in terms of the relationship (manager) between the authenticated principals.

Next, the embodiments of the invention provide a method by which varied classes of authorization policies can be implemented using the same authorization policy provider. An authorization provider is configured in a java.security file of java_home/jre/lib/security. For a Java® Virtual Machine (JVM), it is configured by changing the property auth.policy.provider of the java.security file. Since the generic authorization covers a wide variety of authorization policies, even with the limitation that there can be only one authorization policy provider, a number of applications, each having its own authorization requirement, can be run on the same JVM. As the embodiments of the invention have a single XML authorization file, this file can have different authorization rules for different applications. Each authorization rule will be defined in terms of the application objects specific to that application. Moreover, the authorization infrastructure will use the single authorization file. Hence, varied classes of authorization policies can be implemented using the same authorization policy provider.

The embodiments of the invention further provide a method to group actions at deployment time. Actions can be grouped to provide different authorization requirements for different groups of actions. At deployment time it can be decided that the same authorization will be used for, 'read' and 'search' actions, for example. This is accomplished as the authorization policy is stored in the authorization XML file. At deployment time, by simply changing the XML, the above-described grouping of actions can be accomplished.

Next, the embodiments of the invention provide a method to fulfill authorization requirements without having to write any new code. A new authorization scenario can be obtained at deployment time by changing the declarative settings. This is accomplished as indicated above, simply by changing the XML. As such the embodiments of the invention provide a new policy, which does not require changes to the code. Since authorization requirements are expressed in XML rather than integrating them with the application, authorization settings can be changed by simply changing the XML (rather than code changes). In the XML based policy file provided by the embodiments of the invention, a user principal is permitted access to a certain Java® object if it has certain characteristics represented using the returned value of certain "Java® bean-like" methods such as getOwner, getManager, etc.

The embodiments of the invention further include a method to represent varied authorization requirements in an XML format. The format includes specifying objects using some field or method calling on the Java® object, specifying principals using relationships, and grouping actions. The embodiments of the invention also represent environmental variables such as time, day, etc. in the XML format and define authorization policies on these variables. This is particularly advantageous because by including a number of methods to identify objects in the XML format, the embodiments of the invention produce a wide variety of options for authorization settings. These options include: field value and method return value for Java® objects, principal and relationships among them, and environmental variables, among others. Thus, the embodiments of the invention can change the authorization policy at deployment time, which can make use of the JAAS standard. In other words, the advantages of JAAS are obtained by and instance-level authorization without making use of programmatic authorization.

Moreover, the embodiments of the invention provide a generic permission class, which has a constructor that allows the passing of the object on which the authorization is to be checked and/or the object which is making the access request. Conventionally, in JAAS, a Permission object is required for checking the permission using an access controller. Conversely, according to the method provided by an embodiment of the invention, the Permission class is extended using GenericPermission so that object, on which the permission is asked, is a parameter of the Permission object passed to the access controller 208. Thus, the access controller 208 can decide on an authorization based on the object passed on to it. This aspect is used to provide authorization rules based on the characteristics of the particular instance of application object on which the authorization decision is to be made. As mentioned earlier, in JAAS, the authorization policy is independent of the instance of the application object and the policy is the same for all instances of the application object of the same category. Using the above technique of using a generic permission class that takes the object instance as a parameter, the embodiments of the invention can provide instance-level authorization.

Next, the embodiments of the invention provide a generic policy file that allows the use of environmental variables, allows the representation of dynamic method calls using reflection, and allows the representation of expressions, predicated logic, etc. For example, the embodiments of the invention provide a format to write authorization requirements. The format includes specifying objects using some field or method call on the Java® object, specifying principals using relationships, and grouping actions. The embodiments of the invention also represent environmental variables such as time, day, etc. in the XML format and define authorization policies on these variables.

Additionally, the embodiments of the invention provide a Policy File implementation that parses the generic policy file, understands the syntax of the Generic Policy File, and creates a GenericPermissionCollection out of the Generic Policy File based on the past user Object, user Principal/user Subject, and user code. This is accomplished by using a new type of GenericPermission class, whereby a different type of policy file implementation is used. Accordingly, the embodiments of the invention understand the general format of the Generic Policy File, but do not necessarily understand the object constraint logic specified in the policy file. However, the implementation creates a GenericPermission class using the policy file. As such, the GenericPermission class, as described earlier, understands the object constraint logic specified in the policy file.

Thus, the embodiments of the invention use of a GenericPermission class that uses the policy file and understands the declarative specification of the policy language and is capable to get values of environmental variables, evaluate expressions and predicate logic, and uses Java® reflection to obtain run-time parameter values. In other words, the embodiments of the invention understand the logic written in the generic XML based policy file.

Furthermore, the embodiments of the invention provide a GenericPermission Collection class that stores a collection of the GenericPermission and calls the implied method of GenericPermission, which is capable of understanding the Generic Policy File. Generally, the embodiments of the invention define a generic collection of permissions that take the object as one of the parameters, which works in a JAAS environment in accordance with JAAS specifications. Specifically, the embodiments of the invention provide a Java® based policy, which provides access control or an authorization defined in an XML format. Environmental variables are specified declaratively in an XML format to define authorization parameters of an authorization policy for Java®. The XML is application independent and the use of declarative variables permits the generic authorization by defining the Java® parameters of class, method, and object in XML. Several different policies are described in XML and the policies are declared as environmental variables. To change authorization policies, a declaration of an environmental variable is modified. Moreover, each application can have a different policy and can be specified declaratively in an XML format when the user logs in with a particular username and password.

Figure 9:
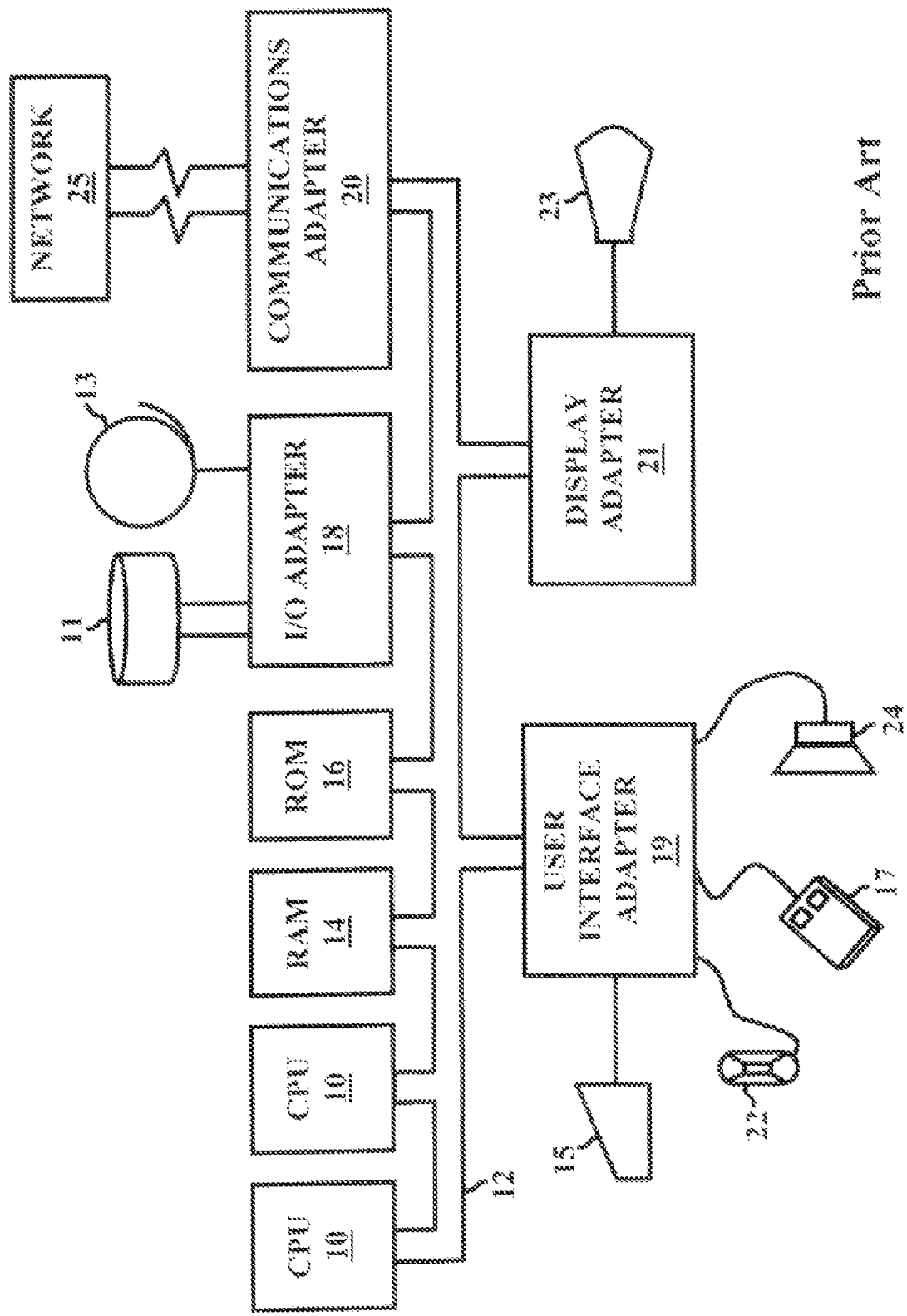
FIG. 9 is a computer system diagram according to an embodiment of the invention.

A representative hardware environment for practicing the embodiments of the invention is depicted in FIG. 9. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The authorization technique provided by the embodiments of the invention provides a method to fulfill authorization requirements without writing any new code, wherein a new authorization scenario can be obtained at deployment time by changing the declarative settings. Additionally, the embodiments of the invention provide a technique to: represent varied authorization requirements in an XML format; parse and generate object groups for authorization purposes using object constraints logic; add environmental variables as authorization parameters; define relationships between authenticated principals; implement a varied class of authorization policies using the same authorization policy provider; and group actions at deployment time. The embodiments of the invention are useful for all Java® applications in J2EE®/non-J2EE® environments. Moreover, the environments described herein applies to all the J2EE®/non-J2EE® applications.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A computer-implemented method of accessing, by a user, a software application object using an authorization policy, said software application object being part of a software application written in an object-oriented, structured, imperative programming language, and modifying, by said user, said software application object, said method comprising:
   generating a software application object group, comprising a plurality of software application objects, from a software application object description document run on a data processor;
   selecting said software application object group by any instance of a specified object method call result and a specified object field value;
   creating said authorization policy for each said software application object group in a single generic authorization file, said single generic authorization file having different authorization rules for different software application objects;
   sending said selected software application object group to an access controller;
   establishing access control parameters using said any instance of said specified object method call result and said specified object field value, for said user to access said selected software application object group based on said authorization policy;
   changing, by said user, said authorization policy by modifying a declarative specification of environmental variables of said authorization policy and modifying constraints defined on attributes of a software application object, including code, in said selected software application object group; and
   modifying, by said user, said software application object, including code, in said selected software application object group of said software application.

2. The method of claim 1, wherein said authorization policy comprises an eXtensible Markup Language (XML) format.

3. The method of claim 1, further comprising specifying said software application object group using a predetermined relationship among all software application object groups.

4. The method of claim 1, further comprising specifying said software application object group using predetermined grouping actions to parse said software application object description document into said at least one software application object group.

5. The method of claim 1, further comprising implementing varied classes of authorization policies using a same authorization policy classifier.

6. A computer-implemented method of controlling access to a software application object of a software application written in an object-oriented, structured, imperative programming language, by an an authorization policy that allows a user to modify said software application object, said method comprising:
   grouping software application objects in said software application according to a grouping parameter, said grouping parameter selecting a software application object group by any instance of a specified object method call result and a specified object filed value;
   establishing a user profile for each class of user accessing said software application objects;
   specifying an authorization policy comprising access control parameters for each of the grouped software application objects in a single generic authorization file, said single generic authorization file having different authorization rules for different software application objects;
   matching said authorization policy with said user profile for user access to said selected software application object group identified by said any instance of said specified object method call result and said specified object field value;
   changing, by said user, said matched authorization policy by modifying a declarative specification of environmental variables of said matched authorization policy and modifying constraints defined on attributes of a software application object, including code, in said selected software application object group; and
   modifying, by said user, said software application object, including code, in said selected software application object group of said software application.

7. The method of claim 6, wherein in said grouping, said software application comprises a software application object description document comprising said software application objects, wherein said authorization policy comprises an eXtensible Markup Language (XML) format.

8. The method of claim 6, wherein in said grouping, said grouping parameter comprises specifying said software application objects using a predetermined relationship among all software application objects in said software application.

9. The method of claim 6, wherein in said grouping, said grouping parameter comprises specifying said software application objects using predetermined grouping actions to parse said software application into at least one software application object group.

10. The method of claim 6, further comprising implementing varied classes of authorization policies using a same authorization policy classifier.

11. A computer system for accessing, by a user, a software application object using an authorization policy, said software application object being part of a software application written in an object-oriented, structured, imperative programming language, and modifying, by said user, said software application object, said system comprising:

a memory that stores said software application; and
a processor configured to:
generate a software application object group, comprising a plurality of software application objects, from a software application object description document run on said processor;
select said software application object group by any instance of a specified object method call result and a specified object field value;
create said authorization policy for each said software application object group in a single generic authorization file, said single generic authorization file having different authorization rules for different software application objects;
send said selected software application object group to an access controller;
establish access control parameters using said any instance of said specified object method call result and said specified object field value, for said user to access said selected software application object group based on said authorization policy;
change, by said user, said authorization policy by modifying a declarative specification of environmental variables of said authorization policy and modifying constraints defined on attributes of a software application object, including code, in said selected software application object group; and
modify, by said user, said software application object, including code, in said selected software application object group of said software application.

12. The system of claim 11, wherein said authorization policy comprises an eXtensible Markup Language (XML) format.

13. The system of claim 11, wherein said software application object group is specified using a predetermined relationship among all software application object groups.

14. The system of claim 11, wherein said software application object group is specified using predetermined grouping actions to parse said software application object description document into said at least one software application object group.

15. The system of claim 11, wherein said authorization policy classifier is adapted to implement varied classes of authorization policies.

16. A computer program storage device readable by computer, tangibly embodying a computer program of instructions executable by said computer to perform a computer-implemented method of accessing, by a user, a software application object using an authorization policy, said software application object being part of a software application written in an object-oriented, structured, imperative programming language, and modifying, by said user, said software application object, said method comprising:

generating a software application object group, comprising a plurality of software application objects, from a software application object description document run on a data processor;
selecting said software application object group by any instance of a specified object method call result and a specified object field value;
creating said authorization policy for each said software application object group in a single generic authorization file, said single generic authorization file having different authorization rules for different software application objects;
sending said selected software application object group to an access controller;
establishing access control parameters using said any instance of said specified object method call result and said specified object field value, for said user to access said selected software application object group based on said authorization policy;
changing, by said user, said authorization policy by modifying a declarative specification of environmental variables of said authorization policy and modifying constraints defined on attributes of a software application object, including code, in said selected software application object group; and
modifying, by said user, said software application object, including code, in said selected software application object group of said software application.

17. The computer program storage device of claim 16, wherein said authorization policy comprises an eXtensible Markup Language (XML) format.

18. The computer program storage device of claim 16, wherein said method further comprises specifying said software application object group using a predetermined relationship among all software application object groups.

19. The computer program storage device of claim 16, wherein said method further comprises specifying said software application object group using predetermined grouping actions to parse said software application object description document into said at least one software application object group.

20. The computer program storage device of claim 16, wherein said method further comprises implementing varied classes of authorization policies using a same authorization policy.

* * * * *